United States Patent Office 3,427,243
Patented Feb. 11, 1969

3,427,243
HYDROCRACKING PROCESS
Robert H. Hass, Fullerton, Paul F. Helfrey, Whittier, and Frank C. Riddick, Orange, Calif., assignors to Union Oil Company of California, Los Angeles, Calif., a corporation of California
No Drawing. Continuation-in-part of application Ser. No. 573,203, Aug. 18, 1966. This application May 8, 1967, Ser. No. 636,659
U.S. Cl. 208—111     15 Claims
Int. Cl. C10g 13/10

ABSTRACT OF THE DISCLOSURE

Group VIII noble metal-promoted zeolite hydrocracking catalysts are employed for the hydrocracking of hydrocarbon oils under a novel combination of conditions to achieve a high efficiency operation wherein each volume of catalyst is forced to convert at least about 2.4 volumes of liquid feed per hour to products boiling below the initial boiling point of the feed, while still maintaining low catalyst deactivation rates. These objectives are achieved essentially by employing a combination of (1) relatively high feed throughput rates, (2) relatively high temperatures, and (3) relatively high pressures.

This application is a continuation-in-part of application Ser. No. 573,203, filed Aug. 18, 1966, now abandoned, which in turn is a continuation-in-part of application Ser. No. 403,348, filed Oct. 12, 1964, now abandoned.

BACKGROUND AND SUMMARY OF INVENTION

This invention relates to the catalytic hydrocracking of hydrocarbons to produce therefrom low-boiling hydrocarbons, boiling for example in the gasoline and jet fuel range. More specifically, the invention is concerned with a novel manner of using certain zeolitic hydrocracking catalysts comprising as the cracking base a crystalline zeolite of the molecular sieve type wherein the zeolitic cations are predominantly hydrogen ions and/or polyvalent metal ions. It has most unexpectedly been discovered that zeolite hydrocracking catalysts of this nature, when promoted with a Group VIII noble metal hydrogenating component, can be utilized at much higher efficiency levels than had heretofore been contemplated, while at the same time materially reducing hydrogen consumption rates and obtaining gasoline products of higher octane value.

In essence, this high-efficiency operation is carried out by correlating hydrocracking temperature with liquid hourly space velocity so as to maintain a normal, relatively high conversion per pass to desired products, but at substantially higher liquid hourly space velocities than are conventionally employed. By operating in this manner, it has been discovered that it is possible to maintain liquid hourly conversions to products boiling below the feed range amounting to at least about 2.4, and up to about 18 volumes, per volume of catalyst per hour. The most surprising aspect of this discovery is that, at these high operating efficiency levels, the deactivation rate of the catalyst is not materially increased, as compared to operations at lower efficiency levels.

It is known that the zeolite catalysts of this invention are much more active for hydrocracking than the more conventional hydrocracking catalysts based on amorphous gel-type cracking bases such as silica-alumina. In the past, this higher activity has been utilized primarily to lower the initial hydrocracking temperature required for a given conversion per pass, and it was assumed that by operating in this manner, the maximum run length could be obtained between catalyst regenerations. Under this conventional practice, a hydrocracking run would be initiated at temperatures of, e.g., about 500–550° F., to give about 50% conversion per pass at the usual space velocities of about 0.5 to 1.5. As the run proceeded, catalyst deactivation would be compensated by incremental temperature increases until a terminal temperature of, e.g., about 800° F. was reached, at which time the catalyst would require regeneration because of unfavorable product distribution and dry gas make.

During such a continuous run, the instantaneous deactivation rate of the catalyst (measured in terms of average daily temperature increase required to maintain the predetermined constant conversion per pass) is, at a given pressure, primarily a function of hydrocracking temperature. At the initial low temperatures, below about 550° F., and at terminal high temperatures above about 850° F., relatively high deactivation rates normally prevail; lowest deactivation rates are observed in the intermediate range of about 550–850° F. Superimposed upon this relationship, however, is the effect of quantum of conversion per unit of catalyst volume per hour, herein termed liquid hourly conversion per volume of catalyst (LHC/V), defined as follows:

$$LHC/V = \frac{LHSV \times C/P}{100}$$

where LHSV is liquid hourly space velocity, and C/P is the volume-percent conversion per pass (based on feed) to products boiling below the feed boiling range. LHC/V is thus numerically equivalent to the volume of feed converted per hour per volume of catalyst.

All past experience in catalytic hydrocracking has indicated that the absolute deactivation rate at a given temperature and pressure is directly proportional to the LHC/V factor. It has now been found, however, that the catalysts of this invention are unique in that their deactivation rate at a given pressure appears to be substantially a simple function of hydrocracking temperature, and under the conditions of temperature and pressure hereinafter prescribed, is almost independent of the LHC/V factor, at least up to LHC/V values in the range of about 12–18. Taking advantage of this discovery, it has been found that a much more efficient utilization of the catalyst can be had by carrying out the hydrocracking run at a predetermined, relatively high space velocity of, e.g., 6–15, and at relatively high temperatures correlated with space velocity to give the desired conversion per pass. As the run progresses, the temperature is gradually raised to compensate for catalyst deactivation while maintaining the desired conversion per pass.

The most surprising aspect of this novel mode of procedure is that the desired conversion levels per pass can be maintained at the high space velocities and high LHC/V's without encountering the expected high catalyst deactivation rates. In fact, the deactivation rate was found to be substantially the same as that encountered at the much lower space velocities and LHC/V's used in conventional practice. At the same time, by virtue of the relatively high temperatures maintained during the run, the additional advantage is obtained of producing a more uniform, high quality gasoline product, both in the light $C_5$–$C_6$ fraction and the heavier $C_7$–400° F. fraction, as compared to conventional low-space-velocity operation at lower temperatures. Moreover, the additional advantage is obtained of a marked reduction in hydrogen consumption per barrel of gasoline produced, or per barrel of feed treated.

The foregoing results have been found to be critical to the unique, noble metal-promoted zeolite catalysts employed herein. When similar high space velocity, high LHC/V hydrocracking runs were attempted using the more conventional noble metal hydrocracking catalysts based on amorphous silica-alumina mixtures, the deactivation rate appeared to be a function of the LHC/V, and run lengths no greater than about 5–10 days were obtainable before temperatures of 850° F. were reached. Similar high deactivation rates resulted from the use of zeolite catalysts promoted with a non-noble metal, specifically nickel.

In the nomal course of operation of the process of this invention, a hydrocracking run is initiated at temperatures of, e.g., about 550–720° F. (depending mainly on nitrogen content of the feed) and at a space velocity of, e.g., between about 6 and 15, adjusted to give the desired conversion per pass to gasoline (normally about 30 to 70 volume-percent based on feed), and the operation can be continued with daily temperature increases of about 0.02° to 2° F. per day, until a terminal temperature in the range of about 750 to 820° F. is reached, after which the run is discontinued for catalyst regeneration. Operating in this manner, run lengths ranging between about 3 months and 12 months or more are easily obtainable. This is comparable to the run lengths obtained in the more conventional mode of operation wherein the hydrocracking run is initiated at lower temperatures of, e.g., about 475–600° F., at the lower space velocities of about 1.5, and continued to the same terminal temperature. This is due to the fact that when hydrocracking runs are initiated at low temperatures, the initial deactivation rate is considerably higher than the rate which prevails at higher temperatures in the range of 550–720° F.

Many economic factors enter into determining the feasibility of a given hydrocracking operation. If an expensive catalyst is employed, the amount required to obtain a given daily conversion, and its on-stream life, become highly important factors. On-stream efficiency, i.e., the ratio of days on-stream to total time including downtime for regeneration, is also an important factor because downtime for regeneration represents idle capital and lost production profits amounting in many cases to thousands of dollars per day. Regardless of how inexpensive the catalyst may be, it is still desirable to operate at high space velocities in order to minimize the size of the high pressure reactor required for a given conversion. Other important considerations in hydrocracking are overall yields, hydrogen consumption per barrel of gasoline produced, product quality, and product distribution as between dry gas ($C_1$–$C_3$), butanes, and liquid products. Where the principal desired product is gasoline, one of the main disadvantages of conventional hydrocracking processes is that they produce a relatively low octane gasoline which must be subjected to catalytic reforming. The lower the octane value of the hydrocracked gasoline, the more reforming capacity required.

According to the present invention, important economies are effected in hydrocracking catalyst inventory and reactor volume required for a given conversion, in hydrogen consumption, and in reforming capacity required to maintain a given daily production of gasoline of desired octane value. At the same time there is little or no reduction in on-stream efficiency, and substantially no increase in dry gas or butane make when evaluated on the basis of the after-reforming yield structure, with the total $C_7+$ gasoline production being reformed to equivalent octane values. These favorable comparisons are made both with respect to conventional hydrocracking operations using amorphous gel-type catalysts, and to hydrocracking processes using zeolite catalysts at the usual low space velocities.

Feedstocks which may be employed herein include in general any hydrocarbon material boiling above the boiling range of the desired product. For purposes of gasoline production, the primary feedstocks comprise straight-run gas oils, coker distillate gas oils, deasphalted crude oils, cycle oils derived from catalytic or thermal cracking operations and the like. These feedstocks may be derived from petroleum crude oils, shale oils, tar sand oils, coal hydrogenation products and the like. Specifically it is preferred to use feedstocks boiling between about 400° and 900° F., having an API gravity of about 20 to 35°, and containing at least about 20% by volume of acid soluble components (aromatics plus olefins). The process of this invention may also be used to advantage for converting naphthas and/or light gas oils boiling up to about 600° F. to propane-butane mixtures, commonly referred to in the art as liquefied petroleum gas (LPG).

Where maximum run lengths of, e.g., 12 months or more are desired, a critical qualification of feedstocks for use herein concerns to nitrogen content thereof. For purposes of this invention, nitrogen content may be divided into two categories, namely ammoniacal nitrogen, and native organic nitrogen present in the feed. Ammoniacal nitrogen is defined as ammonia, or aliphatic amines such as butyl amine which are easily convertible to ammonia. native organic nitrogen is defined as the nitrogen which is found in the initial feed in the form of heterocyclic compounds, or other complex amines which are less readily convertible to ammonia under the hydrocracking conditions. In respect to ammoniacal nitrogen, substantial amounts ranging up to about 100 parts per million thereof (weight-percent based on feed) can be tolerated in the process of this invention, but in respect to native feed nitrogen, usually no more than about 20–30 parts per million can be tolerated. For maximum hydrocracking efficiency at the high space velocities employed herein, it is preferred that the feedstock contain less than about 50 p.p.m. of ammoniacal nitrogen, and less than about 10 p.p.m. of native feed nitrogen.

As as consequence of the foregoing limitations on tolerable feed nitrogen contents for maximum run lengths, three different modes of operation are contemplated herein, depending upon the initial nitrogen content of the feedstock. Raw feeds containing less than about 20–30 p.p.m. of native organic nitrogen may if desired be subjected to the hydrocracking operation without pretreatment for nitrogen removal. Feedstocks containing more than 30 p.p.m. of native organic nitrogen, and up to about 50–100 p.p.m., may be subjected to a prior catalytic hydrofining operation under conventional conditions to convert most of the native nitrogen to ammoniacal nitrogen, and the total effluent from the hydrofiner may then be passed directly to the hydrocracker. In the case of feedstocks containing more than 100 p.p.m. of native organic nitrogen, a separate or non-integral prehydrofining operation is preferably employed, and ammonia is separated from the hydrofined product before it goes to the hydrocracker. The first two of the foregoing alternative measures are suggested merely as a means of minimizing the added expense involved in hydrofining. But where such consideration is not controlling, it is preferred that the feed to the hydrocracker be substantially free of both native feed nitrogen and ammoniacal nitrogen in order to obtain maximum efficiency of catalyst utilization.

Notwithstanding the foregoing preferences in regard to feed nitrogen content, it is entirely feasible in accordance with the present invention, to employ feeds containing up to about 2,000 p.p.m. of ammonical nitrogen and up to about 200 p.p.m. of native organic nitrogen, in cases where reduced run lengths of, e.g., 4–12 months can be economically tolerated. In some cases it may be preferable to accept somewhat reduced run lengths if the added expense is offset by the reduction or elimination of required hydrofining facilities.

Another significant factor to be considered in respect to feedstocks is sulfur content. The process of this invention is amenable to a "sweet" operation using substantially sulfur-free feeds and recycle gases, or a "sour" operation using feeds containing up to about 4% by weight of sulfur. The sweet operation, wherein the reactor charge contains less than about 50 p.p.m. of sulfur, based on feed, is advantageous from the standpoint of minimizing temperatures, increasing run lengths, obtaining maximum jet and diesel fuel product quality, producing a mercaptan-free product, and eliminating the need for expensive alloy steel construction. A sour operation may be preferred however, from the standpoint of obtaining a more aromatic gasoline product, and minimizing hydrogen consumption.

Hydrocracking conditions to be employed herein fall within the following general ranges:

TABLE 1

| | Broad Range | Preferred Range |
|---|---|---|
| Average Bed Temp., ° F.: | | |
| Start of Run | 530–760 | 550–740 |
| End of Run | 700–850 | 750–820 |
| Pressure, p.s.i.g | 500–5,000 | 800–3,000 |
| H₂/Oil Ratio, M s.c.f./b | 2–20 | 4–15 |
| LHSV | 2.4–25 | 4–20 |
| Conversion per pass to products boiling below feed, vol. percent based on feed | 10–100 | 30–70 |
| LHC/V | 2.4–18 | 3–14 |
| Average Daily Temp. Increase to Maintain Conversion, ° F | 0–3 | 0–1 |

The selection of specific operating conditions within the foregoing ranges depends upon several considerations, principally the type of feedstock employed, the specific activity of the catalyst, and the desired LHC/V value. The higher temperatures within the foregoing ranges will normally be used in conjunction with feedstocks rich in nitrogen and/or where relatively high LHC/V values are to be maintained. Sulfur-containing feeds also require somewhat higher temperatures for equivalent conversion rates. Conversely, when the feed is relatively free of nitrogen and sulfur compounds, and/or where relatively low LHC/V values are to be maintained, temperatures in the lower portion of the ranges will be utilized. The overall pressure and hydrogen/oil ratios have relatively small effects upon instantaneous conversion rates within the prescribed ranges, but do have significant effects on catalyst deactivation rates and run lengths, as will be explained hereinafter. For economic reasons it is ordinarily desirable to maintain at least about 20 volume-percent conversion per pass to 400° F. end-point gasoline, and preferably between about 40 and 70 percent.

An important effect of hydrogen partial pressure during hydrocracking lies in its determining effect upon catalyst deactivation rates, and thus run lengths between regenerations. For obtaining run lengths of at least about 4 months, and up to 2 years or more, it is generally preferred to employ pressures above about 1,000 p.s.i.g. and sometimes in the range of about 2,000–3,500 p.s.i.g. The use of high pressures during conventional hydrocracking processes is often prohibitive because of the expense of the large heavy-walled reactors required for operation at the conventional low space velocities. A unique advantage in the process of this invention, afforded by taking maximum advantage of the high activity of the catalyst employed, resides in the greater economic attractiveness of high-pressure operations made possible by reducing the size of reactor required for a given conversion rate. In other words, the maintenance of long run lengths by the use of high pressures becomes much more attractive economically when the process can be operated at high LHC/V values, entailing smaller reactors, all of which is made possible by utilizing to maximum efficiency the unique zeolite catalysts of this invention.

The most critical aspect of the unique hydrocracking catalysts employed herein resides in the nature of the zeolite cracking base upon which the Group VIII noble metal hydrogenating component is distended. These crystalline, siliceous zeolites are sometimes referred to in the art as molecular sieves, and are composed usually of silica, alumina and one or more exchangable cations such as sodium, hydrogen, magnesium, calcium, etc. They are further characterized by crystal pores of relatively uniform diameter between about 4 and 14 A. It is preferred to employ zeolites having a relatively high SiO₂/Al₂O₃ mole-ratio, between about 2.0 and 12, and even more preferably between about 3 and 8. Suitable zeolites found in nature include for example mordenite, stilbite, heulandite, ferrierite, dachiardite, chabazite, erionite, and faujasite. Suitable synthetic zeolites include for example those of the "B," "X", "Y" and "L" crystal types, or synthetic forms of the natural zeolites noted above, especially synthetic mordenite. The preferred zeolites are those having crystal pore diameters between about 8–12 A., wherein the SiO₂/Al₂O₃ mole-rato is about 3–6 and the average crystal size is less than about 10 microns along the major dimension. A prime example of a zeolite falling in this preferred group is the synthetic Y molecular sieve.

The naturally occurring zeolites are normally found in a sodium form, an alkaline earth metal form, or mixed forms. The synthetic zeolites normally are prepared first in the sodium form. In any case, for use as a cracking base it is preferred that most or all of the original zeolitic monovalent metals be ion-exchanged out with a polyvalent metal, and/or with an ammonium salt followed by heating to decompose the zolitic ammonium ions, leaving in their place hydrogen ions and/or exchange sites which have actually been decationized by further removal of water as described in U.S. Patent No. 3,130,006:

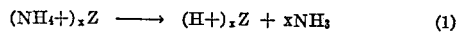

$$(NH_4+)_xZ \longrightarrow (H+)_xZ + xNH_3 \qquad (1)$$

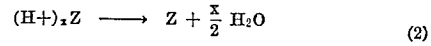

$$(H+)_xZ \longrightarrow Z + \frac{x}{2} H_2O \qquad (2)$$

There is some uncertainty as to whether the heating of the ammonium zeolites produces a hydrogen zeolite or a truly decationized zeolite, but it is clear that, (a) hydrogen zeolites are formed upon initial thermal decomposition of the ammonium zeolite, and (b) if true decationization does occur upon further heating of the hydrogen zeolites, the decationized zeolites also possess desirable catalytic activity. Both of these forms, and the mixed forms, are designated herein as being "metal-cation-deficient." The preferred cracking bases are those which are at least about 10%, and preferably at least 20%, metal-cation-deficient, based on the initial ion-exchange capacity. A specifically desirable and stable class of zeolites are those wherein at least about 20% of the ion-exchange capacity is satisfied by hydrogen ions, and at least about 20% by polyvalent metal ions such as magnesium, calcium, zinc, rare earth metals, etc.

Mixed polyvalent metal-hydrogen zeolites may be prepared by ion-exchanging first with an ammonium salt, then partially back-exchanging with a polyvalent metal salt, and then calcining. In some cases, as in the case of synthetic mordenite, the hydrogen forms can be prepared by direct acid treatment of the alkali metal sieves.

The essential active metals employed herein as hydrogenation components are the noble metals of Group VIII, i.e., ruthenium, rhodium, palladium, osmium, iridium, and platinum, or mixtures thereof. The preferred metals are palladium and platinum. In addition to these metals, other promoters may also be employed in conjunction therewith, including the metals of Groups VIB and VIIB, e.g., moylbdenum, chromium, manganese, etc., and the Iron Group metals, e.g. nickel.

The amount of noble metal in the catalyst can vary within wide ranges. Broadly speaking, any amount between about 0.01% and 5% by weight may be used, but it is normally preferred to use about 0.1% to 3%. The preferred method of adding the metal is by ion exchange. This is accomplished by digesting the zeolite, preferably in its ammonium form, with an aqueous solution of a suitable compound of the desired metal wherein the metal is present in a cationic form, as described for example in U.S. Patent No. 3,236,762.

Following addition of the hydrogenating metal, the resulting catalyst powder is then filtered off, dried, pelleted with added lubricants, binders, or the like if desired, calcined at temperatures of, e.g., 700–1,200° F. in order to activate the catalyst and decompose zeolitic ammonium ions. The foregoing catalysts may be employed in undiluted form, or the powdered catalyst may be mixed and copelleted with other relatively less active adjuvants, diluents or binders such as activated alumina, silica gel, coprecipitated silica-alumina cogel, magnesia, activated clays and the like in proportions ranging between about 5% and 50% by weight. These adjuvants may be employed as such, or they may contain a minor proportion of an added hydrogenating metal, e.g., a Group VIB and/or Group VIII metal.

The LHSV and LHC/V values referred to herein are determined with respect to the volume of active catalyst employed, i.e. the total bulk volume of pelleted material comprising both a zeolite cracking base and a homogeneously distributed hydrogenating component deposited thereon. Catalyst volume is thus inclusive of any relatively less active material copelleted with the zeolite, but does not include free space in the reactor or the volume of any relatively non-catalytic material in the form of separate granules or pellets which may be employed as a diluent or support for catalyst beds.

At the end of a hydrocracking run, the deactivated catalyst may be regenerated in the conventional manner by oxidation at, e.g., 700–1,000° F. using air or other oxygen-containing gases.

The following examples are cited to illustrate the invention and certain of its critical novel aspects, but are not to be construed as limiting in scope:

Example I

This example is cited to illustrate the unexpected discovery that deactivation rates of the catalysts here concerned are substantially independent of the LHC/V factor, as above defined. To obtain this comparison it was necessary to carry out two parallel hydrocracking runs, A and B, at essentially the same temperatures, pressures and conversions per pass, but at substantially different liquid hourly space velocities. This was accomplished by adding sufficient ammoniacal nitrogen to the feed to the low space velocity run, B, to effect an artificial partial deactivation of the catalyst so that an equivalent conversion per pass could be obtained at the same temperature employed in the high space velocity run, A.

The catalyst employed in each of the runs was a copelleted mixture of about 80 weight-percent of a Y molecular sieve zeolite containing 0.5 weight-percent palladium, and an activated alumina binder containing about 0.3 weight percent palladium. The Y molecular sieve cracking base had a $SiO_2/Al_2O_3$ mole-ratio of about 4.7, about 35% of the zeolitic ion-exchange capacity being satisfied by magnesium ions (3 weight-percent MgO), about 10% by sodium ions, and the remainder by hydrogen ions. This zeolite base was prepared by first subjecting a sodium Y molecular sieve to ion exchange with an aqueous ammonium salt solution, and then partially back-exchanging the resulting ammonium zeolite with magnesium sulfate solution.

The initial feedstock employed in both runs was a hydro-fined blend of gas oils having a gravity of 34.6° API, a boiling range of about 400–850° F., an aromatic content of about 27 volume-percent, and containing about 6 parts per million of native organic nitrogen. In order to maintain the catalyst in a sulfide condition throughout the runs, 0.9 weight-percent sulfur was added as thiophene, and in order to provide sufficient ammoniacal nitrogen to permit operating at 1.5 space velocity in run B, 0.16 weight-percent of nitrogen was added as tertiary butyl amine to the feed for that run. The feed for run A contained no added nitrogen. Hydrocracking conditions constant throughout both runs were: Pressure, 1500 p.s.i.g.; hydrogen/oil ratio, 8,000 s.c.f. per barrel. After run conditions had been stabilized during an initial 28 day period, the significant conditions and results during a 7-day period were as follows:

TABLE 2

| | Days on-stream | | | | | |
|---|---|---|---|---|---|---|
| | 28 | | 33 | | 34 | |
| Run | A | B | A | B | A | B |
| LHSV | 9.0 | 1.5 | 9.0 | 1.5 | 9.0 | 1.5 |
| LHC/V | 3.6 | 0.6 | 3.6 | 0.6 | 3.6 | 0.6 |
| Avg. Bed Temp., °F | 720 | 716 | 718 | 719 | 723 | 719 |
| Conversion to 400° F. E.P. Gasoline, vol. percent | 39.8 | 41.0 | 39.3 | 40.0 | 40.0 | 40.0 |
| $C_1$–$C_3$ Gas Make, s.c.f./b. feed | 70.2 | 30.7 | 70.2 | 40.1 | 82.2 | 42.3 |
| Liquid Yields, vol. percent feed: | | | | | | |
| Butanes [1] | 9.2 | 4.3 | 8.5 | 4.6 | 9.7 | 4.5 |
| Pentanes | 7.1 | 5.0 | 7.8 | 5.0 | 7.7 | 4.5 |
| $C_6$ | 8.3 | 6.4 | 6.8 | 6.5 | 7.6 | 6.5 |
| $C_5$–$C_6$ | 14.4 | 11.4 | 14.6 | 11.5 | 15.3 | 11.0 |
| $C_7$–400° F | 24.3 | 34.3 | 23.7 | 33.6 | 22.4 | 33.4 |
| $C_5$–$C_6$ Gasoline: | | | | | | |
| Gravity, °API | 79.6 | 81.3 | 79.3 | 81.9 | 80.0 | 81.8 |
| Octane, F-1 Clear | 87.0 | | 87.0 | 86.0 | 86.6 | 86.0 |
| Composition, vol. percent: | | | | | | |
| Paraffins | 80.6 | 82.1 | 80.9 | 82.0 | 81.0 | 81.4 |
| Naphthenes | 14.4 | 15.3 | 13.9 | 15.5 | 13.8 | 15.9 |
| Aromatics | 2.7 | 1.5 | 2.7 | 1.6 | 2.7 | 1.7 |
| $C_7$–400° F. Gasoline: | | | | | | |
| Gravity, °API | 43.4 | 45.3 | 43.0 | 44.9 | 42.7 | 45.0 |
| Octane Nos.: | | | | | | |
| Clear | 78.0 | 68.8 | 77.8 | 70.0 | 78.7 | 70.2 |
| F-1+3 ml. TEL [2] | 93.4 | 87.9 | 92.9 | 87.8 | 95.5 | 87.2 |
| Composition, vol. percent: | | | | | | |
| Paraffins | 20.7 | 23.4 | 20.5 | 22.4 | 19.3 | 22.4 |
| Naphthenes | 41.5 | 47.3 | 41.2 | 47.1 | 40.1 | 47.2 |
| Aromatics | 37.9 | 29.4 | 38.2 | 30.6 | 39.9 | 30.6 |

[1] Corrected for butane derived from decomposition of tert butyl amine and thiophene.
[2] Corrected to sulfur-free basis; products contained undecomposed thiophene.

Catalyst deactivation rates in the above runs were measured in terms of average daily temperature increase required to maintain the 40% conversion per pass. During the first 14 days of the runs this value fluctuated between about 1° and 5° F. per day, but leveled out during the 26–33 day interval to about 0.3° F. per day, and the difference between the two runs was indistinguishable in respect to catalyst deactivation rates. Based on this data, it is evident that a total run length of at least about 230 days would be obtainable in each case before a terminal temperature of, e.g., 780° F. is reached, and past experience indicates that much longer run lengths would actually result because deactivation rates normally decline to a level below that indicated at the 26–33 day interval as the run progresses. Experimental conditions did not permit accurate determination of chemical hydrogen consumption during the runs, but order-of-magnitude figures clearly indicated a substantially lower hydrogen consumption per barrel of feed for the high space velocity run A.

From the foregoing it is apparent that the high space velocity run A presents the decided advantages of: (1) reduced catalyst requirements per barrel of product, without substantial sacrifice of on-stream efficiency; (2) higher yields and quality of light $C_5$–$C_6$ gasoline; (3) higher quality of $C_7$–400° F. gasoline, thus reducing the required reforming capacity for achieving the desired final octane levels; (4) lower hydrogen consumption rates; and (5) reduced reactor size. The seeming disadvantages of lower $C_7$–400° F. gasoline yields and higher $C_1$–$C_4$ makes, substantially disappear if the the results are compared on an after-reforming basis to raise the low-octane heavy gasoline from run B to the level of run A; the gas make and liquid volume shrinkage during reforming result in overall yield structures which are very similar for the two runs.

Example II

To compare the results obtainable using the molecular sieve catalyst of Example I under more conventional conditions of low space velocity and low temperatures, the following comparative data is cited to illustrate the results obtainable in parallel hydrocracking processes carried out at the 60 volume percent conversion level to 400° F. end-point gasoline, at 1,500 p.s.i.g. using 8,000 s.c.f. per barrel of hydrogen. The catalyst in each run, C and D, was essentially the same as the catalyst employed in Example I and the feed is essentially the same hydrofined gas oil containing added sulfur. The significant comparative results are as follows:

TABLE 3

| Run | C | D |
|---|---|---|
| LHSV | 9 | 1.5 |
| LHC/V | 5.4 | 0.9 |
| Average Bed Temp., °F | 721 | 598 |
| Liquid Yields, vol. percent of feed: | | |
| Butanes | 16.5 | 8.6 |
| $C_5$–$C_6$ Gasoline | 22.5 | 12.5 |
| $C_7$–400° F. Gasoline | 32.5 | 45.2 |
| Product Octane Nos.: | | |
| $C_5$–$C_6$ Gasoline: | | |
| F-1 Clear | | 86.1 |
| F-1+3 ml. TEL | [1] 98.6 | 98.5 |
| $C_7$–400° F. Gasoline: | | |
| F-1 Clear | 75.4 | 54.0 |
| F-1+3 ml. TEL | 86.0 | 79.0 |

[1] Not corrected for product sulfur content; would be about 1 octane number higher on sulfur-free basis; product from run D was sulfur-free.

The marked superiority of the $C_7$–400° F. gasoline product obtained at the higher temperatures in high space velocity run C is clearly evident from the foregoing data. Here again, the yield structure favors the production of light $C_5$–$C_6$ gasoline in the high space velocity run in preference to the heavy $C_7$–400° F. gasoline.

Example III

In order to demonstrate that the results obtainable in the practice of this invention are critical to the use of the crystalline zeolite type catalysts, another hydrocracking run was carried out using the same feedstock and conditions employed in run A of Example I, but using instead of the zeolite catalyst a conventional amorphous catalyst consisting of 0.5 weight-percent palladium deposited upon a coprecipitated silica-alumina cogel cracking base containing 87 weight-percent silica and 13 weight-percent alumina. At 9.0 space velocity, the desired 40% conversion per pass was initially obtained at a temperature of about 752° F. but could be maintained during the first 90 hours of the run only by raising the catalyst bed temperature 30° F. or more per day. After 248 hours on-stream, the hydrocracking temperature had reached 850° F., and the conversion was only 9 volume-percent per pass.

It is thus evident that the high LHC/V operation of this invention is critical to the use of zeolite catalysts, and that run lengths of less than 10 days result when conventional amorphous catalysts are employed therein.

Example IV

This example illustrates the effect of sulfur and nitrogen content of the feed on hydrocracking temperature levels required for high and low LHC/V operations, and also the resulting product distributions.

The catalysts in all runs were essentially the same copelleted Pd-Y zeolite composition described in Example I. The initial feeds in runs E, H and K were hydrofined gas oils boiling in the 400–850° F. range, essentially free of sulfur and nitrogen. In the remaining runs, sufficient tert-butyl amine and/or thiophene was added to the respective feeds to give the indicated sulfur and nitrogen contents. All runs were carried out at 1,500 p.s.i.g., with 8,000 s.c.f./b. of added hydrogen. The significant conditions and results of the runs were as follows:

TABLE 4

| Run | E | F | G | H | I | J | K | L | M |
|---|---|---|---|---|---|---|---|---|---|
| LHSV | 1.5 | 1.5 | 1.5 | 4.0 | 4.0 | 4.0 | 6.0 | 6.0 | 6.0 |
| LHC/V | 0.89 | 0.92 | 0.67 | 2.38 | 2.31 | 1.6 | 3.47 | 3.56 | 2.4 |
| Avg. Bed Temp., °F | 519 | 586 | 716 | 566 | 649 | 762 | 597 | 685 | 787 |
| Catalyst Age, days | 10.1 | 7.7 | 22.0 | 10.6 | 34.5 | 52.1 | 10.6 | 34.4 | 52.7 |
| Conversion per pass to 400° F., E.P. Gasoline, vol-percent | 59.3 | 61.1 | 43.7 | 59.5 | 57.7 | 40.2 | 61.2 | 59.4 | 40.2 |
| Feedstocks: | | | | | | | | | |
| Gravity, °API | 39.8 | 34.3 | 35.4 | 38.6 | 38.2 | 38.1 | 38.6 | 38.2 | 38.1 |
| Sulfur, p.p.m | 1 | 3,400 | 3,400 | 5 | 3,500 | 8,850 | 5 | 3,500 | 8,850 |
| Nitrogen, p.p.m | 1 | 12 | 2,000 | 1 | 1 | 1,830 | 1 | 1 | 1,830 |
| $C_1$–$C_3$ Gas Make, s.c.f./b | 18.6 | 26.6 | 19.7 | 20.7 | 50.2 | 57.3 | 27.7 | 101.4 | 81.8 |
| Liquid Yields, vol-percent of feed: | | | | | | | | | |
| $C_4$–$C_6$ | 22.7 | 25.5 | 15.4 | 27.0 | 33.5 | 21.1 | 29.1 | 42.1 | 24.7 |
| $C_7$–400° F | 48.7 | 46.7 | 32.0 | 45.7 | 37.9 | 24.9 | 43.5 | 28.5 | 20.6 |
| $C_5$–$C_6$ Gasoline: | | | | | | | | | |
| Gravity, °API | 84.4 | 82.2 | 82.0 | 84.4 | 85.4 | 84.6 | 84.4 | 85.5 | 84.5 |
| Octane No. F-1 Clear | 83.3 | 85.1 | 83.7 | 82.7 | 86.3 | 86.0 | 82.5 | 85.9 | 86.5 |
| Vol.-percent Isoparaffins | 78.2 | 74.9 | 72.1 | 75.8 | 85.0 | 84.0 | 74.6 | 84.0 | 84.8 |
| $C_7$–400° F. Gasoline: | | | | | | | | | |
| Gravity, °API | 54.5 | 49.4 | 45.3 | 54.5 | 52.2 | 48.4 | 54.8 | 51.4 | 47.2 |
| Vol.-percent Aromatics | 0.4 | 14.6 | 27.5 | 0.4 | 18.5 | 31.7 | 0.9 | 23.7 | 37.0 |
| Octane Nos.: | | | | | | | | | |
| F-1 Clear | 42 | 58.9 | | 45.2 | 60.5 | 70.5 | 45.3 | 65.2 | 75.2 |
| F-1+3 ml. TEL [1] | 69.1 | 80.3 | 83 | 70.3 | 77.8 | 85.0 | 70.1 | 80.6 | 87.1 |

[1] Not corrected for unconverted sulfur present in products from Runs F, G, I, J, L and M.

Runs H and K show that, in the absence of sulfur and nitrogen compounds, 60% conversion to gasoline can be obtained at high space velocities (4 and 6 respectively) and at hydrocracking temperatures below 600° F. The addition of sulfur to the feed in runs I and L required a substantial increase in temperature to maintain 60% conversion, and resulted in a substantial increase in both the $C_5$–$C_6$ and $C_7$–400° F. gasoline product quality. In runs J and M the addition of both sulfur and nitrogen to the feed required a further substantial increase in temperature, even to maintain 40% conversion, resulting in a $C_7$–400° F. gasoline product of increased aromaticity and octane number. Despite the increased octane, the high temperature required indicates shorter projected run lengths; hence the low-nitrogen feeds are normally preferred.

A comparison of product yields as between runs H through M, and runs E through G, shows that the high LHC/V operations give higher yields of $C_5$–$C_6$ gasoline and lower yields of $C_7$–400° F. gasoline, which is normally desirable.

In all the foregoing runs, the catalyst deactivation rates were low, requiring less than about 0.5° F. average temperature increase per day to maintain conversion.

Example V

This example illustrates the effect of varying the feed nitrogen content in a sulfur-free feed on hydrocracking temperatures required to maintain 60 volume-percent conversion per pass to 400° F. end-point gasoline at 4.0 space velocity. All runs were carried out at 1,500 p.s.i.g. and with 8,000 s.c.f./b. of added hydrogen. The hydrofined 400–850° F. gas oil feed contained about 1 p.p.m. of sulfur and was essentially nitrogen-free. Varying amounts of tert-butyl amine were added in runs O and P to achieve the indicated nitrogen contents. The results were as follows:

TABLE 5

| Run | N | O | P |
|---|---|---|---|
| LHSV | 4 | 4 | 4 |
| LHC/V | 2.4 | 2.4 | 2.4 |
| Nitrogen content of feed, p.p.m. | 0 | 580 | 2,180 |
| Conversion per pass to 400° F., E.P. Gasoline, vol. degree | 60 | 60 | 60 |
| Av. Bed Temp., ° F | 560 | 712 | 752 |
| Vol. degree Aromatics in $C_7$–400° F. Gasoline Product | 0.5 | 3.5 | 10.2 |

The foregoing data shows, in relation to Example IV, that nitrogen compounds repress hydrocracking activity to a greater extent than sulfur compounds, and do not increase product aromaticity as effectively as sulfur compounds. However, the catalyst deactivation rates remain low, requiring less than about 0.5°F. average temperature increase per day to maintain conversion.

Example VI

This example demonstrates that the low deactivation rates achieved with palladium-zeolite catalysts cannot be achieved using a nickel-zeolite catalyst. The catalyst employed was a copelleted composite of about 20 weight-percent activated alumina and 80 weight-percent of a Y zeolite cracking base upon which was impregnated sufficient aqueous nickel nitrate solution to deposit thereon about 10 weight-percent of NiO. The Y zeolite cracking base was a mixed magnesium-hydrogen form having a $SiO_2/Al_2O_3$ mole-ratio of about 4.7, containing about 1.4 weight-percent $Na_2O$, wherein about 35% of the exchange capacity was satisfied by magnesium ions and about 55% by hydrogen ions. This catalyst was tested for hydrocracking activity over an extended run employing three basic feedstocks described below in Table 6. Feed A was an unconverted gas oil from a previous hydrocracking run, while feeds B and C were hydrofined gas oils derived from a blend of catalytic cracking cycle oils and straight-run gas oils.

TABLE 6

| | Feeds | | |
|---|---|---|---|
| | A | B | C |
| Gravity, °API | 39.4 | 31.7 | 31.2 |
| Boiling Range, °F.: | | | |
| Initial | 405 | 384 | 410 |
| 10% | 560 | 434 | 433 |
| 50% | 555 | 502 | 487 |
| 95% | 730 | 643 | 610 |
| Maximum | 800 | 687 | 636 |
| Nitrogen, p.p.m. | 0.5 | 3 | 1.0 |
| Sulfur, p.p.m. | 5 | 5 | 3 |
| Aromatics, vol. percent | 19 | -------- | 46 |
| Aniline Point, °F | 176 | 120 | 115.4 |

The run was carried out in once-through operation using 8,000 s.c.f./b. of hydrogen and other conditions as set forth in Table 7 below. Deactivation rates and product yields were determined during five basic run periods, principally in order to determine the effect of minor variations in sulfur and nitrogen content of the feed. It should be noted that the catalyst was not presulfided for run period A–1, but was presulfided prior to run period A–2. The principal conditions and results of the run were as follows:

TABLE 7

| Feed | A | A | A+93 p.p.m. $S^2$ | B+50 p.p.m. $S^2$ | C+50 p.p.m. $S^2$ |
|---|---|---|---|---|---|
| Run Period | A–1 | A–2 | A–3 | B–1 | C–1 |
| Catalyst Age, hrs | 40–74 | 120–148 | 160–188 | 192–220 | 224–250 |
| LHSV | 1.5 | 1.5 | 3.0 | 3.0 | 3.0 |
| Pressure, p.s.i.g. | 1,000 | 1,000 | 1,500 | 1,500 | 1,500 |
| Temperature, ° F | 550–570 | 671–689 | 716–729 | 740–775 | 780–864 |
| T.I.R.,[1] ° F | ~14 | ~16 | ~12 | ~30 | ~80 |
| Vol. percent Conversion to 420° F. End-point products | 58.6 | 55.8 | 53.1 | 60.2 | 64.6 |
| $C_5$–420° F. Gasoline yield, vol. percent | 63.0 | 52.3 | 42.4 | 40.8 | -------- |

[1] Average Daily Temperature Increase required to maintain about 60 vol. percent conversion.
[2] Sulfur added as thiophene.

The foregoing data clearly demonstrates that, even at the relatively low space velocity of 3.0, nickel-zeolite catalysts deactivate very rapidly, so that run lengths of not more than about 10 days are obtainable. At higher space velocities, the deactivation rate is even higher. In addition, it should be noted that the efficiency of conversion to gasoline was very low.

It is not intended that the invention should be limited to the details described herein, or in the examples, since many variations may be made by those skilled in the art without departing from the scope or spirit of the following claims:

We claim:
1. In a catalytic hydrocracking process wherein a stream of mineral oil feedstock is contacted in admixture with hydrogen, and under hydrocracking conditions, with a hydrocracking catalyst comprising a minor proportion of a Group VIII noble metal hydrogenating component deposited upon a zeolitic alumino-silicate molecular sieve cracking base having a $SiO_2/Al_2O_3$ mole-ratio between about 2 and 12, and wherein the zeolitic cations are mainly hydrogen ions and/or polyvalent metal ions, the improved method for obtaining long run lengths at increased catalytic efficiency which comprises:

(1) maintaining a liquid hourly space velocity during said contacting which is at least about 2.4 volumes of liquid feed per volume of catalyst per hour;

(2) maintaining a hydrocracking pressure above about 1,000 p.s.i.g., and temperatures sufficient to give at at least about 10 volume-percent conversion per pass of said feedstock to synthetic products boiling below the initial boiling point of the feed;

(3) correlating said hydrocracking temperature and said liquid hourly space velocity so as to maintain an LHC/V value between about 2.4 and 18, said LHC/V value being defined as the number of volumes of said feedstock converted per hour per volume of catalyst;

(4) gradually increasing the hydrocracking temperature at a rate which is (a) sufficiently high to maintain LHC/V values within the range set forth in step (3), and (b) sufficiently low to provide a run length of at least about four months at temperatures below about 820° F. without oxidative regeneration of said catalyst; and (5) recoverying desired low-boiling hydrocarbons from the effluent from said contacting.

2. A process as defined in claim 1 wherein said Group VIII noble metal hydrogenation component is palladium.

3. A process as defined in claim 1 wherein said molecular sieve cracking base is a Y-crystal type having a $SiO_2/Al_2O_3$ mole-ratio between about 3 and 6, and an average crystal size less than about 10 microns along the major dimension.

4. A process as defined in claim 1 wherein the initial feedstock is a gas oil, and the major product recovered in step (5) is gasoline.

5. A process as defined in claim 1 wherein the hydrocracking temperature is increased in step (4) by an average of no more than about 3° F. per day.

6. A process as defined in claim 1 wherein the initial feedstock contains less than about 100 p.p.m. of ammoniacal nitrogen, and less than about 30 p.p.m. of native organic nitrogen.

7. A process as defined in claim 1 wherein sulfur, equivalent to at least about 50 p.p.m. based on feed, is maintained in the hydrocracking zone in order to produce a more aromatic product.

8. A process as defined in claim 1 wherein less than about 50 p.p.m. of sulfur, based on feed, is present in the hydrocracking zone, whereby a relatively non-aromatic product is produced.

9. A process as defined in claim 1 wherein said liquid hourly space velocity is greater than about 4.0 and said LHC/V value is greater than about 3.0.

10. A process for the catalytic hydrocracking of a gas oil boiling above the gasoline range to produce therefrom high-octane gasoline over an extended hydrocracking run of at least about 4 months, employing as the hydrocracking catalyst a Group VIII noble metal hydrogenation component deposited upon a zeolitic alumino-silicate molecular sieve cracking base having a $SiO_2/Al_2O_3$ mole-ratio between about 2 and 12, and wherein at least about 20% of the ion-exchange capacity thereof is satisfied by hydrogen ions, which comprises:

(1) passing said feedstock in admixture with hydrogen, and at a pressure above about 1,000 p.s.i.g., through a bed of said catalyst at an initial hydrocracking temperature between about 530° and 760° F., and at a liquid hourly space velocity which is (a) between about 2.4 and 25, and (b) correlated with said hydrocracking temperature so as to maintain an LHC/V value between about 2.4 and 18, said LHC/V value being defined as the number of volumes of feedstock converted to gasoline and lighter products per hour per volume of catalyst;

(2) continuing said hydrocracking run for a period of at least about 4 months without oxidative regeneration of said catalyst while maintaining said LHC/V value by incrementally raising the hydrocracking temperature an average of no more than about 3° F. per day, until a hydrocracking temperature between about 700° and 850° F. is reached;

(3) terminating said hydrocracking run at a temperature below about 850° F.;

(4) subjecting said catalyst to oxidative regeneration at elevated temperatures to remove deactivating coke deposits; and (5) re-establishing said initial hydrocracking contacting procedure as defined in step (1).

11. A process as defined in claim 10 wherein said hydrocracking run as defined in step (2) is continued for a period of at least about 6 months while maintaining said LHC/V value by incrementally raising the hydrocracking temperature an average of no more than about 1° F. per day.

12. A process as defined in claim 10 wherein said Group VIII noble metal hydrogenation component is palladium.

13. A process as defined in claim 10 wherein said molecular sieve cracking base is a Y crystal type having a $SiO_2/Al_2O_3$ mole-ratio between about 3 and 6, and an average crystal size less than about 10 microns along the major dimension.

14. A process as defined in claim 10 wherein said gas oil feedstock contains less than about 100 p.p.m. of ammoniacal nitrogen, and less than about 30 p.p.m. of native organic nitrogen.

15. A process as defined in claim 10 wherein said liquid hourly space velocity is greater than about 4.0 and said LHC/V value is greater than about 3.0.

References Cited

UNITED STATES PATENTS 3,132,090  5/1964  Helfrey et al. _____ 208—89

DELBERT E. GANTZ, *Primary Examiner.*

T. H. YOUNG, *Assistant Examiner.*

U.S. Cl. X.R.

208—89